United States Patent
Brehm et al.

(10) Patent No.: US 8,572,246 B2
(45) Date of Patent: *Oct. 29, 2013

(54) METHOD AND APPARATUS FOR HOME NETWORK ACCESS

(75) Inventors: Michael J. Brehm, Allen, TX (US); Corey F. Adams, Frisco, TX (US)

(73) Assignee: Alcatel Lucent, Paris (FR)

(*) Notice: Subject to any disclaimer, the term of this patent is extended or adjusted under 35 U.S.C. 154(b) by 105 days.

This patent is subject to a terminal disclaimer.

(21) Appl. No.: 12/985,730

(22) Filed: Jan. 6, 2011

(65) Prior Publication Data

US 2011/0238833 A1 Sep. 29, 2011

Related U.S. Application Data

(60) Provisional application No. 61/316,553, filed on Mar. 23, 2010.

(51) Int. Cl.
*G06F 15/16* (2006.01)

(52) U.S. Cl.
USPC .......................................... 709/225; 455/433

(58) Field of Classification Search
USPC ........................................................ 709/223
See application file for complete search history.

(56) References Cited

U.S. PATENT DOCUMENTS

| | | | | |
|---|---|---|---|---|
| 6,711,147 B1 * | 3/2004 | Barnes et al. | ................. | 370/338 |
| 6,765,900 B2 * | 7/2004 | Peirce et al. | .................. | 370/351 |
| 6,928,282 B2 * | 8/2005 | Taniguchi | ..................... | 455/433 |
| 7,173,905 B1 * | 2/2007 | Alex et al. | ..................... | 370/230 |
| 8,094,565 B2 * | 1/2012 | Schuringa et al. | ............ | 370/241 |
| 2006/0121919 A1 * | 6/2006 | Amishima et al. | ............. | 455/466 |
| 2007/0047507 A1 * | 3/2007 | Nakatsugawa et al. | ........ | 370/338 |
| 2007/0230453 A1 * | 10/2007 | Giaretta et al. | ................ | 370/389 |
| 2010/0315973 A1 * | 12/2010 | Hirano et al. | .................. | 370/254 |
| 2012/0002645 A1 * | 1/2012 | Sugaya | ......................... | 370/336 |

FOREIGN PATENT DOCUMENTS

WO    WO2008078633    * 3/2008

OTHER PUBLICATIONS

Perkins C et al: "IP Mobility Support; rfc2002.txt", IETF Standard, Internet Engineering Task Force, 3 IETF, CH, Oct. 1, 1996, XP015007786, ISSN: 0000-0003.*
Glass et al., Mobile IP Authentication, Authorization, and Accounting Requirements, Oct. 2000, Nokia Research Center, 28 Pages.*

(Continued)

*Primary Examiner* — Hadi Armouche
*Assistant Examiner* — Christopher C Harris
(74) *Attorney, Agent, or Firm* — S. Wyse

(57) ABSTRACT

A manner of extending a home network to a mobile device. An FA (foreign agent) in the mobile device registers with an HA (home agent) in the home network, preferable exchanging static UIDs (unique identifiers) and certificates. The HA creates an address for the FA and maintains a registration table listing all registered FAs. The FA registration is in most cases performed while the FA is operating non-remotely and directly connected to a component of the home network. The HA registers with an SG (signaling gateway) in a secure manner and awaits a request for access to the home network. After registration with the SG, the HA initiates a heartbeat message that is acknowledged by the SG. When an FA access request is received from the SG, the HA determines whether the FA is registered with the HA and any applicable access limitations prior to granting or rejecting access.

13 Claims, 6 Drawing Sheets

(56) References Cited

OTHER PUBLICATIONS

Mobility for IPV6 (MIP6) H Tshofenig T Tsenov Siemens G Giaretta Tilab J Bournelle GET/INT: "Diameter Applicability for AAA-HA Interface in Mobile IPv6; draft-tschofenig-mip6-aaa-ha-diameter-00.txt",IETF Standard-Working-Draft, Internet Engineering Task Force, IETF, CH, Jul. 11, 2005, XP015040037,ISSN:000-0004 p. 5, paragraph 2-paragraph 5, p. 5, paragraph 1-paragraph 6, p. 7, paragraph 8.

Perkins C et al: "IP Mobility Support; rfc2002.txt", IETF Standard, Internet Engineering Task Force, IETF, CH, Oct. 1, 1996, XP015007786, ISSN: 0000-0003 p. 49, paragraph 2-paragraph 6.

Glass Sun Microsystems T Hiller Lucent Technolgoies S Jacobs GTE Laboratories S C Perkins Nokia Research Center S: "Mobile IP Authentication, Authorization, and Accounting Requirements; rfs2977.txt", IETF Standard, Internet Engineering Task Force, IETF, CH, Oct. 1, 2000, XP015008760, ISSN: 0000-0003; p. 9, paragraph 4, p. 10, paragraph 4-p. 13, paragraph 9; figure 3.

Aboba Microsfot M Beadles Worldcom Advanced Networks B: "The Network Identifier; rfc2486.txt", IETF Standard, Internet Engineering Task Force, IETF, CH, Jan. 1, 1999, XP015008270, ISSN: 0000-0003 p. 6, paragraph 2.

Kent BBN Corp R Atkinson @Home Network S: "Security Architecture for the Internet Protocol; rfc2401.txt", IETF Standard, Internet Engineering Task Force, IETF, CH, Nov. 1, 1998, XP015008185, ISSN: 0000-0003 the whole document.

* cited by examiner

METHOD AND APPARATUS FOR HOME NETWORK ACCESS

CROSS-REFERENCE TO RELATED APPLICATIONS

The present disclosure is related to and claims priority from U.S. Provisional Patent Application Ser. No. 61/316,553, entitled Extending the In-Home Layer 2 Network and filed on 23 Mar. 2010, the entire contents of which are incorporated by reference herein.

TECHNICAL FIELD

The present invention relates generally to the field of communication networks, and, more particularly, to a method and apparatus for facilitating remote access by a subscriber to an in-home communication network.

BACKGROUND

Introductory information will here be provided. Note, however, that the apparatus, techniques, or schemes described herein as existing or possible are presented only as background for describing the present invention, and no admission is intended thereby that these were heretofore commercialized or known to others beside the inventors.

Selected abbreviations are herewith defined, at least some of which are referred to within the following description of the state-of-the-art and the present invention.
ASIC Application Specific Integrated Circuit
CAC Call Admission Control
CRL Certificate Revocation List
DHCP Dynamic Host Configuration Protocol
DSL Digital Subscriber Line
DVR Digital Video Recorder
HA Home Agent
FA Foreign Agent
IEEE Institute of Electrical and Electronics Engineers
IP Internet Protocol
ISP Internet Service Provider
NAT Network Address Translation
OS Operating System
OSS Operations Support Systems
PC Personal Computer
PKI Public Key Infrastructure
PS Proxy Server
RG Residential Gateway
SG Signaling Gateway
QoS Quality of Service
TCP Transmission Control Protocol
UID Unique Identifier Consumer electronics have progressed a great deal in the recent past. Not only are they more capable than they were a short time ago, they are also far more prevalent. Many homes, for example, have more than one personal computer and video storage device, along with many similar devices. These devices are often connected together to form a network, and through the network are capable of communicating with other devices outside of the home. The use of email and telephone services that are available through such networks is very common, and the downloading of, for example, software applications and multimedia transmissions is becoming more frequent.

A home network benefits users in a number of ways. Even if there is no connection to others outside of the home, the home network allows a user to, for example, print from a printer that is not connected directly to the computer in use. Files such as documents, pictures, and videos may be retrieved or sent to another device within the home. Modern data storage units are capable of saving a large amount of audio or video data, and the network permits this content to be retrieved and played on any device connected to the network. Multiple users may participate in a game over the network.

Connections outside of the home are often facilitated by some type of device that serves as an interface to whatever network service is providing access. Such a device may take the form, for example, of a wireless router connecting multiple computers to the Internet, or a set-top box that receives video and television programming for display on a television or other video display device. Many if not most home networks are connected to an access network, which provides a link between a subscriber's home and a core network capable of handling large amounts of communication traffic and providing gateways for communicating through other networks as well.

When the home network is connected to an access network, communications such as email and Internet access are permitted; video and audio content may be downloaded. In addition, recent advances in technology have enlarged the amount of data that may be uploaded, or sent from the home network to others through the access network. In some cases, for example a movie or other video may be sent to another at nearly the speed at which it was downloaded, at least from the user's perception.

This may be of great advantage to the user of a mobile device. As used herein, a mobile device is one capable of accessing a mobile network using radio communications. Mobile devices are very popular because of their mobility; a user may conveniently carry the device with them and use it anywhere a mobile network may be contacted. Mobile network providers have signed up thousands of subscribers and built up networks that cover large geographic areas. In many locations, if a subscriber cannot access their own mobile network, they may use another network as a visitor. Mobile networks are often based on a cell system, where mobile devices communicate with a nearby base station and handover protocols allow them to travel from one cell (base station) to another without significant interruption of an ongoing communication session.

A mobile subscriber at home may be able to access content and devices that are part of the home network, for example using a short range radio protocol such as Bluetooth. When the user is not at home, however, such access is not available, but the content may be accessible in a number of other ways. For example, content accessible via the home network may not actually be stored there, but is rather stored in a remote memory device maintained by a vendor. In other cases the content may be stored within the home network, but is copied or mirrored at a vendor's server for the purpose of providing mobile access. In either case, the user may access the content being stored by the vendor using a mobile device communicating though a mobile network.

There are disadvantages with this strategy, however. For one, storage on a vendor site may raise security concerns. In addition, the vendor may charge for the service and there is a risk that they may at some point become unavailable if their business fails. Finally, the sheer volume of content that users currently want to, and are projected to demand, may make this option less than viable in the future.

Access may also be possible directly to the home network though a mobile network using protocols such as MobileIP. In such an arrangement it is contemplated that the mobile device embodies a foreign agent (FA) that establishes a communication session with a home agent (HA) embodied on one of the devices that makes up the home network. Although this addresses some of the disadvantages associated with third party vendors, several disadvantages remain.

First, to communicate with the FA, the HA obtains an IP address. In general practice, however, this IP address will be dynamically assigned, meaning that he address is not assigned permanently but will eventually be re-assigned to another user. Of course, the HA can request another IP address, but when assigned it will almost certainly be different than the previous one. While the policy of dynamically assigning IP addresses conserves IP addresses and reduces the number ultimately required, it can disrupt routing between the FA and the HA and make it more difficult for the mobile device to register with its respective HA.

In addition, home networks frequently employ a residential gateway, with the HA being assigned a private IP address and being behind a NAT boundary. This also may help to conserve IP addresses, but may make it difficult for the FA to contact the HA and set up a secure tunnel for communications.

In the face of such difficulties, there is a need for a manner of facilitating secure access to a home network from a remote mobile station. Accordingly, there has been and still is a need to address the aforementioned shortcomings and other shortcomings associated with communications between a FA embodied in a mobile device and an HA in a home network. These needs and other needs are satisfied by the present invention.

SUMMARY

The present invention is directed to a manner of facilitating access to a home network by a mobile device. In one aspect, the present invention is a method of providing remote access for a mobile device comprising an FA (foreign agent) to a home network comprising an HA (home agent) including acquiring a UID (unique identifier) in the HA, registering the HA with an SG (signaling gateway), and initiating a heartbeat from the HA to the SG. In a preferred embodiment, the HA receives an acknowledgment message from the SG for each heartbeat message sent. If no acknowledgement is received, registration with the SG may have to be re-executed.

The HA UID may be generated in the HA itself or provided to the HA by another element, for example an SG during HA registration or a device manager. The method may further include registering the FA with the HA, preferably while the FA is connected to the home network or one of the devices of the home network. In this aspect, registering the FA with the HA may include transferring an FA UID to the HA, transferring the HA UID to the FA, and reserving an address for the FA in the HA. It may also include transferring an FA certificate to the HA and transferring an HA certificate to the FA.

The method may further include receiving an FA access request from an SG, determining whether the FA is registered with the HA, and rejecting the access request if the FA is not registered with the HA. If the FA is registered with the HA, the method may include either granting access immediately, or first determining the what access or bandwidth limitations, if any, are applicable to the FA or to transmissions to and from the home network.

In another aspect, the present invention is a home agent for use in a home network including a processor, a memory device accessible to the processor for storing data and program instructions, an SG register for maintaining a registry of available SGs, a heartbeat message generator for generating heartbeat messages after registration with a SG and an FA register for maintaining a registry of FAs permitted to access the home network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
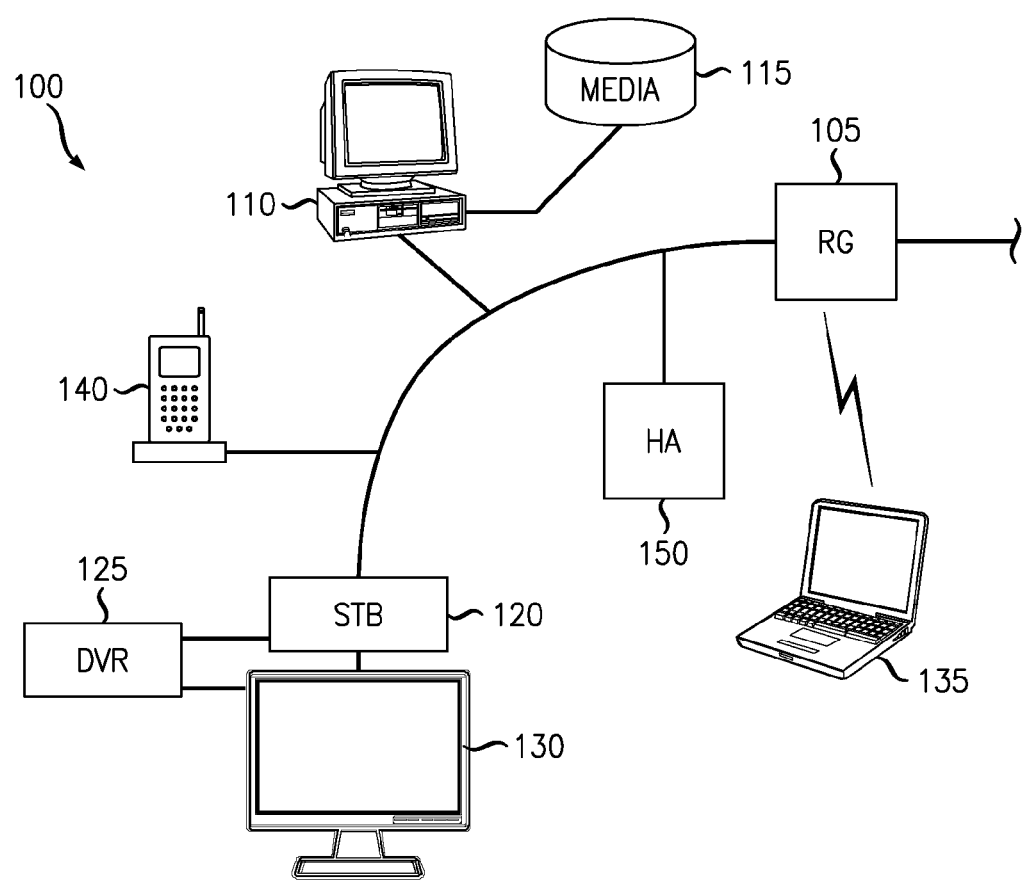
FIG. 1 is a simplified schematic diagram illustrating selected components of a home network according to an embodiment of the invention.

The present invention is directed to a manner of extending a home network to a remote mobile device, and is of particular advantage when implemented in an environment where communication with the home network is limited by a dynamic connection point to the Internet and a NAT (network address translation) boundary FIG. 1 is a simplified schematic diagram illustrating selected components of a home network 100 according to an embodiment of the invention. Note that the home network is so-called because the components used are suitable to acquisition and use in-home by a subscriber, but the same system could just as easily be installed in, for example, a small business, school, or church office setting. For convenience, such a network will be referred to as a home network regardless of whether it is installed in the residence of a single subscriber or in another location.

The various components of a home network could communicate only among themselves—within the home (or other installed location), but this is typically not the case. Communication with outside devices is often one of the reasons for which the home network was established. In the embodiment of FIG. 1, home network 100 includes an RG (residential gateway) 105. RG 105 facilitates communications between home network 100 and an access network (not shown in FIG. 1). The access network in turn provides a conduit to a core communication network and then to other networks and devices (see, for example, FIG. 2).

In the embodiment of FIG. 1, RG 105 may also act as a router to receive communications from outside and transmit them to the various components of network 100. In this embodiment, these components include a PC 110 and associated media storage device 115. Telephone service is also available through home network 100, as represented by telephone 140. A set-top box 120 is also part of home network 100 and is associated with DVR 125. In this embodiment, network 100 also includes a telephone 130 and laptop computer 135. As indicated in FIG. 1, many components of network 100 are connected by a cable to RG 105, while the laptop 135 uses a wireless interface. Of course, this particular combination of components, while not uncommon, is exemplary and other home networks may be configured differently.

In accordance with the present invention, home network 100 also includes an HA (home agent) 150, which has several functions that will be described herein. HA 150 is typically implemented as a physical processor executing instructions stored as software in a non-transitory medium. In other embodiments, the HA may be implemented as a combination of executable software and hardware such as an ASIC. The HA may be a standalone device or incorporated in a multi-function apparatus that performs other duties as well. In some implementations it may, for example, be implemented in RG 105 or PC 110.

In accordance with this embodiment of the present invention, the HA 150 acquires a UID (unique identifier) that may be used for communications sessions involving FAs authorized to access the home network. There are several ways in which this acquisition could be made; in one embodiment the HA simply generates its own UID, for example using the serial number of the processor. In another embodiment, the HA uses a UID in the OS (operating system). In either case, the UID acquisition scheme should insure the uniqueness of the UID. The UID may also be generated by another element, for example, one could be assigned when registering with an SG (signaling gateway; see for example FIG. 2). If generated by another element, the HA would preferably store it in encrypted form in an accessible memory device.

Figure 2:
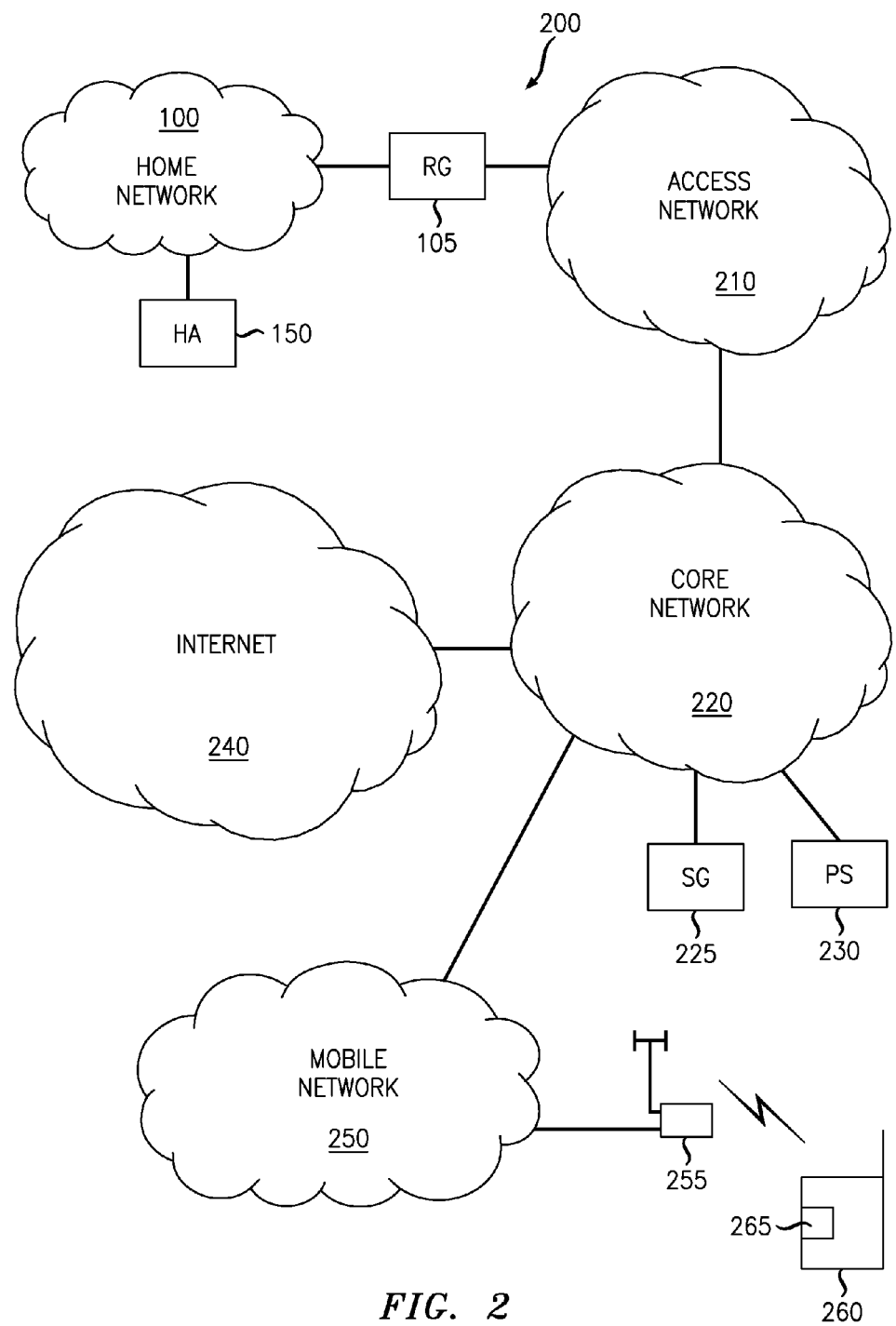
FIG. 2 is a simplified schematic diagram illustrating selected components of a communication network according to an embodiment of the present invention.

FIG. 2 is a simplified schematic diagram illustrating selected components of a communication network 200 according to an embodiment of the present invention. Note that communication network 200 actually includes several networks (or, more accurately, components within those networks, which components are not shown separately). For example, home network 100 is illustrated as a cloud (though shown in more detail in FIG. 1), except that HA 150 is also depicted in FIG. 2, as is RG 105. RG 105 connects the home network 100 to access network 210. Access network may, for example, be a DSL implementation in a PSTN or a PON (passive optical network). Access network 210 in turns provides a connection to core network 220. In general, core network 220 is a large capacity packet data network that routes communications between many different entities, including home network 100 via access network 210.

In this embodiment, for example, the core network 220 is in communication with the Internet 240, providing home network 100 with Internet access. Again, there may be one or more gateway devices used at the interface, though for simplicity these components are not shown individually in FIG. 2. Separately shown, however, are signaling gateway (SG) 225 and proxy server (PS) 230. Each (or both) of these devices could be software executing on a single physical unit or could be implemented using multiple physical devices working cooperatively. The operation of these components in accordance with the present invention will be described below.

In the embodiment of FIG. 2, core network 220 is also connected to mobile network 250. Mobile network 250 typically includes a number of geographically dispersed base stations, each with their own antenna, for communicating with mobile devices in their local area. Antenna/base station 255 is depicted for purposes of illustration. Antenna/base station 255 may include, for example, an eNodeB. Mobile device 260 is also shown and is capable of radio communications with antenna/base station 255 to set up a communication session through mobile network 250. Although only one is shown, a mobile network ordinarily includes a large number of antenna/base stations and employs a protocol for handing over a communication session from one antenna/base station to another when the mobile device relocates.

In this embodiment of the present invention, mobile device 260 includes a FA (foreign agent) 265, which may register with HA 150 in order to access home network 100. In accordance with the present invention a secure communication path, or tunnel, is established between FA 265 of mobile device 260 and HA 150 of home network 100 though SG 225. This process will now be explained in more detail.

Figure 3:
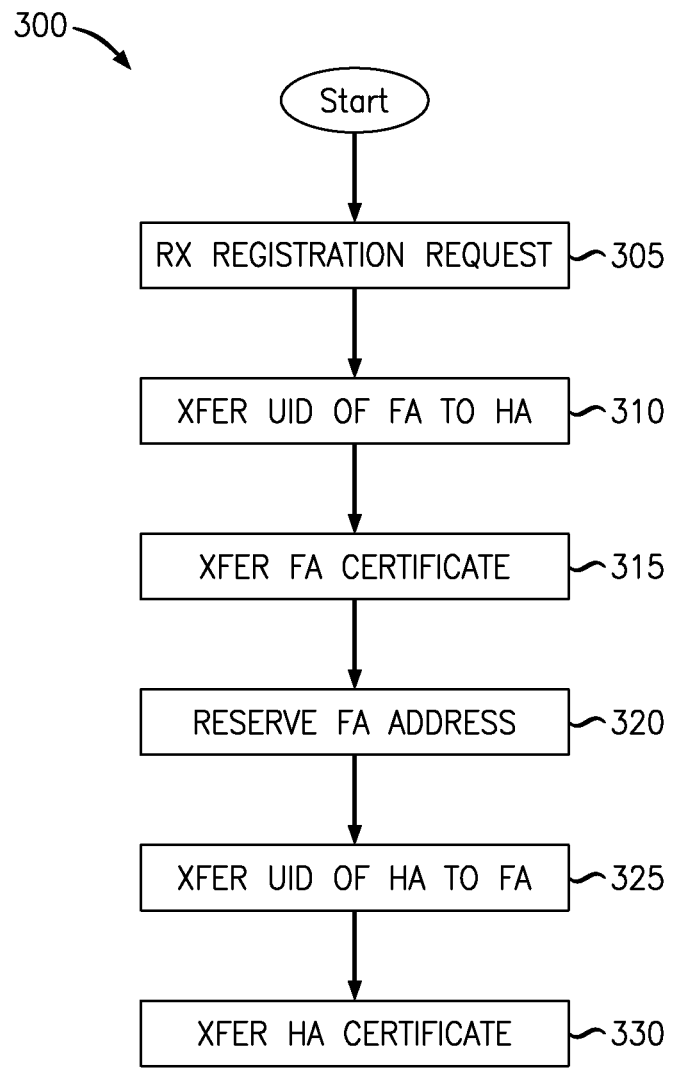
FIG. 3 is a flow diagram illustrating a method according to an embodiment of the present invention.

FIG. 3 is a flow diagram illustrating a method 300 according to an embodiment of the present invention. At START it is presumed that the components necessary to performing the method are available and operational according to the present invention. The process then begins when the HA receives a registration request (step 305). This registration request initiates the registration process for a mobile device so that it may access the home network from a remote location according to the present invention. In this embodiment, the registration process must be done from a non-remote location, that is, while the mobile device is in effect an element of the home network or directly connected to an element of the home network.

For example, the mobile device could be directly connected to the HA via a USB connection, or to a PC that is an element of the same home network as the HA. A short-range wireless protocol may also be used between the mobile device and the HA, for example a WiFi connection or, in the femto-cell network, a RAN protocol. As should be apparent, it is preferred that the home network use a local password, key, or encryption protocol to avoid registration by hackers operating closely enough to communication with the home network directly.

In the embodiment of FIG. 3, the UID of the mobile-station FA is then transferred to the HA (step 310) and stored in a suitable memory device. A copy of the FA certificate is also transferred (step 315). The HA then reserves an address for the FA (step 320). This IP address will be the virtual IP address used by the FA when tunneling into the home network. In one embodiment, the HA receives a block of home network IP addresses for this purpose when it is initially provisioned. In another embodiment, the HA may request creation of an address, for example by communicating with a DHCP server on the RG, for each FA as it registers.

In the embodiment of FIG. 3, the UID of the HA is transferred to the FA (step 325), and in most embodiments a copy of the HA certificate is transferred (step 330) as well. In this way the FA is registered for accessing the home network from a remote location. This process will now be described in more detail.

Figure 4:
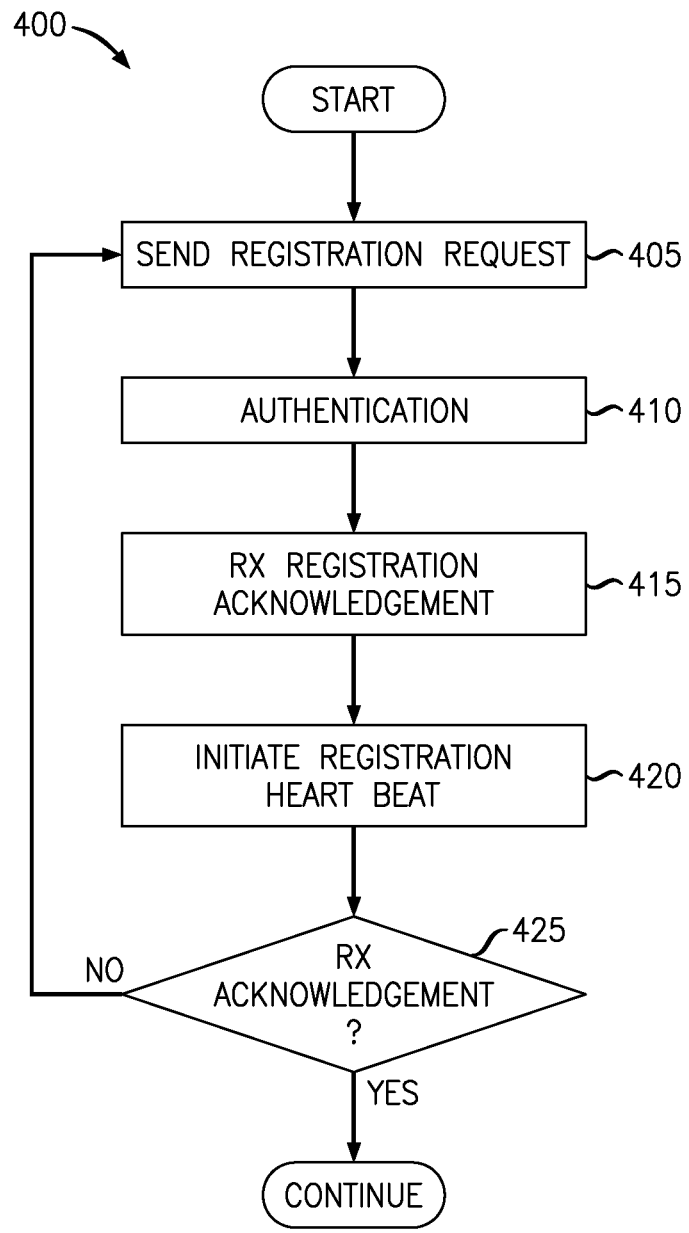
FIG. 4 is a flow diagram illustrating a method according to an embodiment of the present invention.

FIG. 4 is a flow diagram illustrating a method 400 according to an embodiment of the present invention. At START it is presumed that the components necessary to performing the method are available and operational according to the present invention. The process then begins when the HA sends a registration message to an SG (step 405). The registration message will include the UID of the HA. As mentioned above, many home networks are protected by a NAT boundary. In many cases, unsolicited messages from the FA would not pass through the RG. The present invention permits the home network to maintain the NAT boundary while facilitating access though it by authorized mobile devices.

In this embodiment, once the registration message is sent (and received in an SG) an authentication protocol is executed (step 410). In a preferred embodiment, the authentication includes a two-way certificate validation between the HA and the SG, with PKI and certificate templates derive from a trusted party, for example a common root or intermediate certificate authority. It is also preferable to check for a CRL should any certificate authority become compromised. Using two-way certificate validation will avoid having to statically provision HAs or additional servers to the SG. The shared virtual IP address of the SG, however, should be provisioned in a secure manner on the Home Agent. The exact procedure used for authentication will depend to some extent on how the HAs are deployed and managed, and no particular authentication method is required by the present invention unless explicitly recited in a particular embodiment.

In the embodiment of FIG. 4, when the authentication procedure has been successfully completed, the HA receives a registration acknowledgement (step 415). Here it is presumed that the registration process does complete successfully; if it does not the HA may attempt the registration again or notify the user (not shown), as desired in a particular implementation. If the HA is a managed device, it may notify the device manager that registration was not successful (also not shown). The method 400 will not, however, move forward until registration is accomplished.

In this embodiment, once successful registration is acknowledged the HA initiates (step 420) a registration heartbeat. The heartbeat is preferably a periodic series of TCP packets sent from the HA to the SG to ensure that TCP flow is maintained in the NAT table for the home network. For each heartbeat message, the HA expects to receive an acknowledgement (step 425). If this occurs, the process simply continues until the registration is terminated by either device (not shown). If the HA fails to receive an acknowledgment for a particular heartbeat message, then the process returns to step 405 and registration process is re-initiated.

This presumes, of course, that registration is still desired. Naturally, there is no requirement that the HA maintain registration constantly if for some reason access by remote mobile devices is not desired. This may occur for example, if a problem has been detected and the subscriber or, if applicable, the device manager managing the HA determine that access should be suspended until the problem has been alleviated. Note that if a new SG must be used for registering the HA, it is preferred that an existing registration may be transferred (not shown), rather than simply terminating the registration and forcing the HA to re-register with the new SG. Note also that for some bandwidth intensive operations, the link established through an SG may be transferred to a PS (also not shown), in which case it is also preferred that the registration be transferable.

Figure 5:
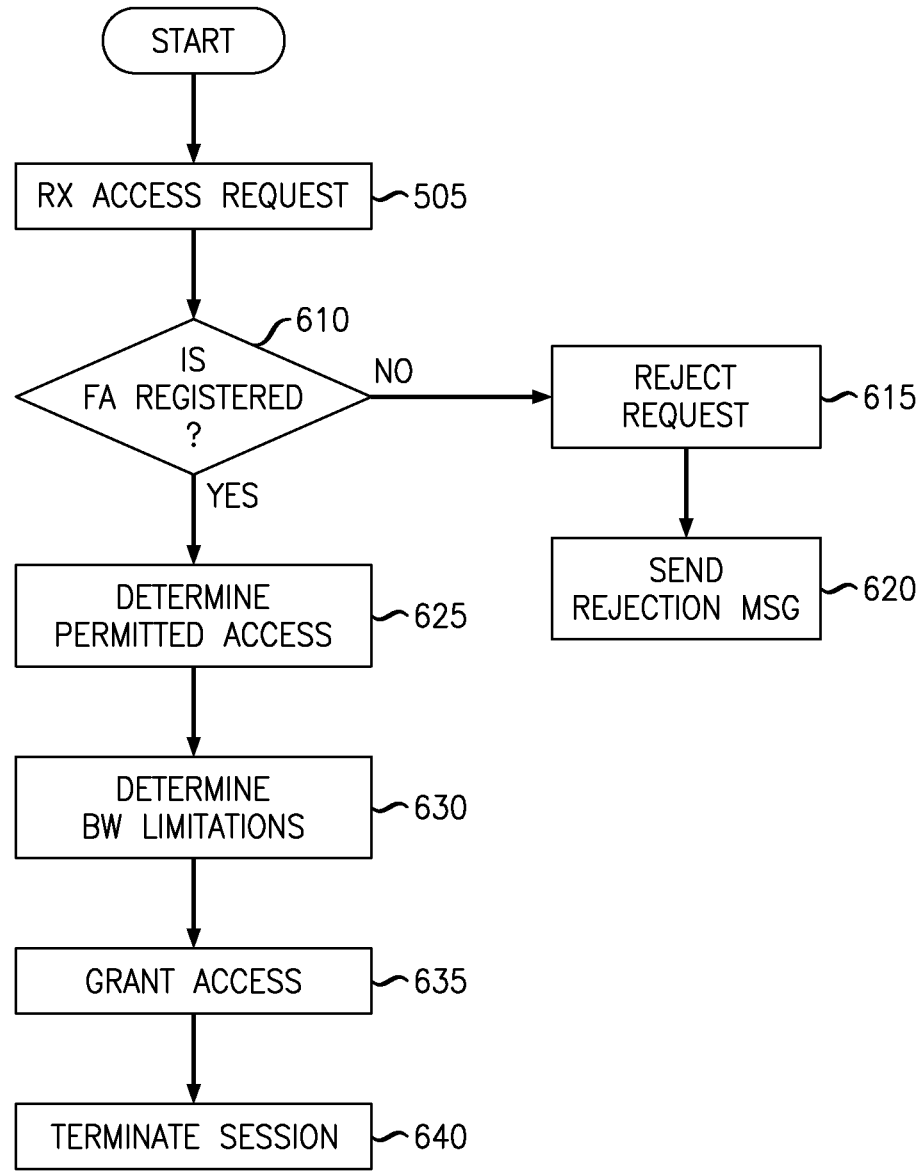
FIG. 5 is a flow diagram illustrating a method according to an embodiment of the present invention.

FIG. 5 is a flow diagram illustrating a method 500 according to an embodiment of the present invention. At START it is presumed that the components necessary to performing the method are available and operational according to the present invention. It is further presumed that the HA in a home network has registered with an SG accessible to a FA, such as an FA embodied in a mobile device. The process then begins when the HA receives a request to initiate a communication session (step 505) between the HA and an FA. This may occur, for example, when a mobile subscriber, using a device embodying the FA, wishes to access the home network in order to retrieve content stored there or to perform some control or monitoring function. A request from an FA in a remote mobile device will generally be received from an SG, which was contacted by the FA to reach the HA. In some alternate embodiments, however, the access request may come from within the home network itself, or from another external network element.

In the embodiment of FIG. 4, the HA then verifies that the FA is registered (step 510) with the HA, for example according to the registration process illustrated in FIG. 3. If the FA is not properly registered with the HA, the communication session request is rejected (step 515). Optionally, a message may be sent (step 520) to notify the SG that access to the home network will not be permitted. This message may include an explanation of the reason access it being denied, or include an invitation to retry at a later time. Presumably, the SG will forward the rejection message to the FA, or generate a similar one for transmission instead (not shown).

In this embodiment, if the FA is properly registered, the HA determines (step 525) what access, if any, should be permitted for this particular FA. Note that discrimination between FAs is not required, nor is limiting a particular FA to less than full home network access. There are implementations, however, where this will be desirable. The HA also determines (step 530) what, if any, bandwidth limitations are applicable. For example, a user may want to upload a multimedia presentation to a remote mobile device, but this may not be permissible due to current traffic conditions or the limits imposed by the home or access network. In a preferred embodiment, the determination of step 530 includes receiving applicable bandwidth limitations from the SG.

In the embodiment of FIG. 4, the HA then permits access (step 535) according to the request for access received and the limitations, if any, determined at steps 525 and 530. A secure tunnel is established between the HA and the SG, which is linked with the tunnel already established between the SG and the FA and in this manner a secure communication session is established for access of the home network by the FA. Note that preferably the heartbeat messages and acknowledgements between the HA and SG (see FIG. 4) continue so that the communication session is not inadvertently terminated.

Returning to FIG. 4, the communication session continues until terminated (step 540). Termination may occur, for example, when the mobile device no longer requires access to the home network. Other reasons for termination may include the initiation of higher priority communications that preclude the access, discovery of security issues, or expiration of a predetermined time limit. Such a limit may be imposed, for example, by an access network that must accommodate many users desiring similar access at the same time. Home network access may also be factored into rate plans for the subscriber, and a session may be terminated according to limits imposed by the rate plan.

Note that the sequence of operations presented above in reference to FIGS. 3 through 5 are exemplary, and the present invention is not limited to the illustrated embodiments. Additional operations may be added, or in some cases removed, without departing from the spirit of the invention. In additional the operations of the illustrated methods may be performed in any logically-consistent order.

Figure 6:
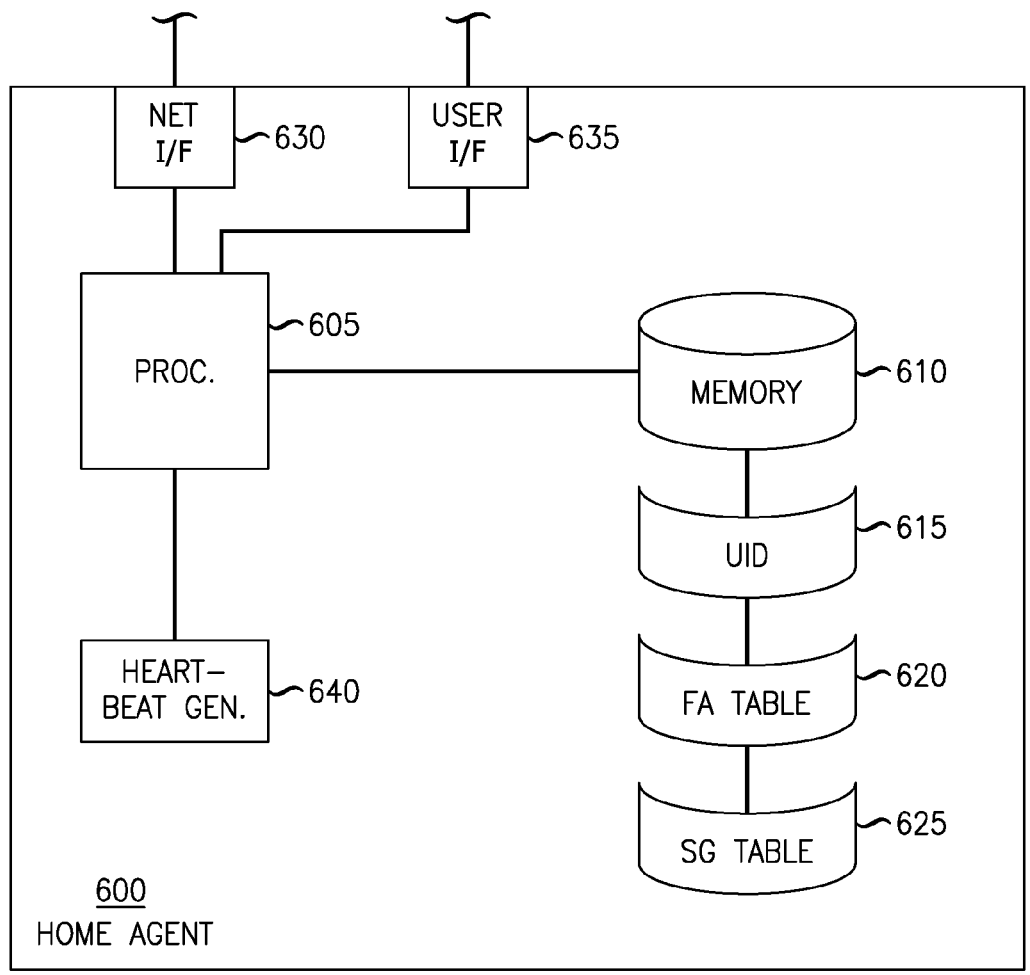
FIG. 6 is a simplified schematic diagram illustrating selected components of an HA according to an embodiment of the present invention.

FIG. 6 is a simplified schematic diagram illustrating selected components of an HA 600 according to an embodiment of the present invention. In this embodiment, the HA 600 includes a processor 605 for controlling the other components of HA 600 and a memory device 610, which stores both data and program instructions for controlling the HA 600. Memory device, as used herein, connotes a physical, non-transitory apparatus. Shown separately is a UID memory device 615 for storing the UID of the HA when it is acquired, preferably in encrypted form. An FA registration table 620 maintains a registry of FAs that have registered with HA 600, including their respective UIDs and authentication certificates. FA registration table 620 may also store access limitations or privileges applicable to each registered FA, if any. An SG table 625 maintains a registry of SG addresses and security information for contacting an SG to register and to set up a secure tunnel for remote mobile device communication sessions when granting remote access.

In this embodiment, HA 600 also includes a network interface 630 for interfacing with the home network, and a user interface 635 for interacting with a user making queries and receiving specifications for HA operation. User interface 635 may be connected to, for example, a keyboard and a display screen for this purpose. A heartbeat generator 640 generates heartbeat messages to maintain TCP flow between the HA 600 and a SG following registration.

Note that HA 600 is an exemplary embodiment and other embodiments of the present invention are possible. For example, some of the components of HA 600 may be combined together in other embodiments, or further subdivided if appropriate. In addition, HA 600 may be implemented in a standalone physical device or incorporated into one of the other home network elements, for example, PC 110 or RG 105 illustrated in FIG. 1.

In this manner the present invention facilitates access to a home network using an HA by a remote mobile device having an FA registered with the HA. A secure tunnel may be established between the FA and an SG, and linked with a secure tunnel between the HA and the SG if access is permitted.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of providing remote access for a mobile device comprising an FA (foreign agent) to a home network comprising an HA (home agent), said method comprising:
acquiring a UID (unique identifier) in the HA;
registering the HA of the home network with an SG (signaling gateway), wherein registering comprises sending a registration message from the HA to the SG, the registration message comprising the UID;
initiating a heartbeat from the HA to the SG; and
registering the FA with the HA;
wherein registering the FA with the HA comprises:
transferring an FA UID to the HA;
transferring the HA UID to the FA; and
reserving an address for the FA in the HA.

2. The method of claim 1, wherein the UID is generated by the HA.

3. The method of claim 1, wherein the UID is received in the HA from the SG.

4. The method of claim 1, wherein the FA is embodied in a mobile device.

5. The method of claim 1, wherein the FA registration is executed non-remotely.

6. The method of claim 1, wherein registering the FA with the HA further comprises:
transferring an FA certificate to the HA; and
transferring an HA certificate to the FA.

7. The method of claim 1, further comprising:
receiving an FA access request from an SG;
determining whether the FA is registered with the HA; and
rejecting the access request if the FA is not registered with the HA.

8. The method of claim 7, further comprising granting access to the FA if the FA is registered with the HA.

9. The method of claim 7, further comprising determining the extent to which the FA may be granted access to the home network.

10. The method of claim 8, further comprising determining the bandwidth limitations, if any, applicable to uploads form the home network to the HA.

11. The method of claim 10, further comprising granting access subject to any determined access or bandwidth limitations if the FA is registered with the HA.

12. The method of claim 1, further comprising receiving an acknowledgement for each transmitted heartbeat message.

13. The method of claim 1, further comprising sending a registration message from the HA to the SG if no expected acknowledgement to a heartbeat message is received.

* * * * *